United States Patent [19]

Hayward

[11] Patent Number: 4,575,274

[45] Date of Patent: Mar. 11, 1986

[54] CONTROLLED TORQUE CONNECTOR ASSEMBLY

[75] Inventor: Robert D. Hayward, Phoenix, Ariz.

[73] Assignee: Gilbert Engineering Company Inc., Glendale, Ariz.

[21] Appl. No.: 471,315

[22] Filed: Mar. 2, 1983

[51] Int. Cl.⁴ .................................................. F16D 9/00
[52] U.S. Cl. ........................................ 403/2; 403/342;
    339/177 R; 285/323; 174/75 C
[58] Field of Search ............... 403/342, 2; 339/177 R,
    339/89 C; 411/1, 2, 3, 8; 285/323, 385, 389;
    174/75 C, 88 C

[56] References Cited

U.S. PATENT DOCUMENTS 3,040,288  6/1962  Edlen et al. ............... 339/177 R X

FOREIGN PATENT DOCUMENTS 560228  10/1923  France ........................ 285/389
81547   8/1963   France ........................ 285/323
854792  11/1960  United Kingdom .......... 411/3

Primary Examiner—Andrew V. Kundrat
Attorney, Agent, or Firm—Don J. Flickinger

[57] ABSTRACT

The compressive force which the gripping means of a connector assembly, having a nut portion rotatably securable to a body portion, can exert upon a coaxial cable in limited to a pre-determined value by a frangible torque transmitting section, fracturable at a known shear strength, intermediate the body portion engaging section and the tool receiving section of the nut.

14 Claims, 11 Drawing Figures

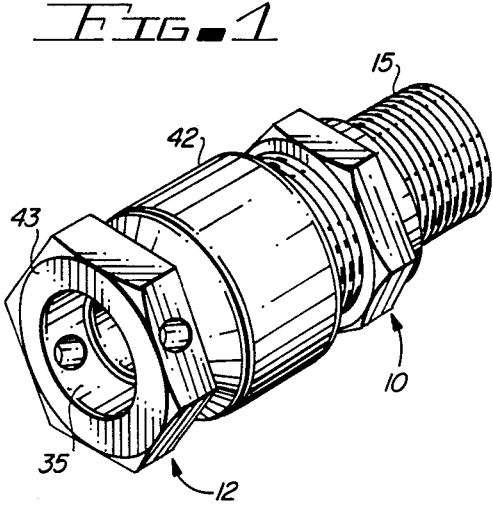
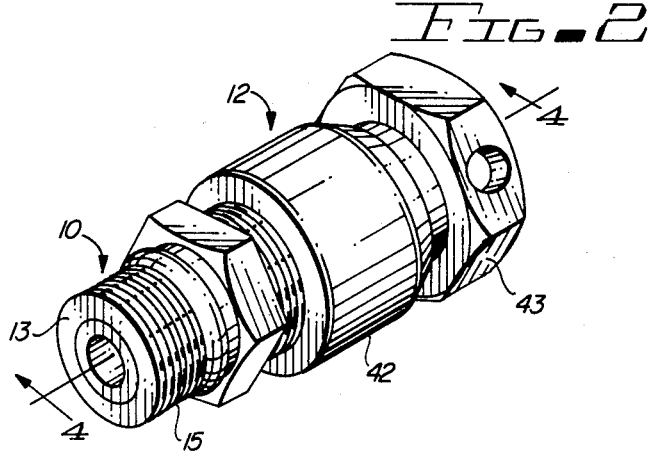
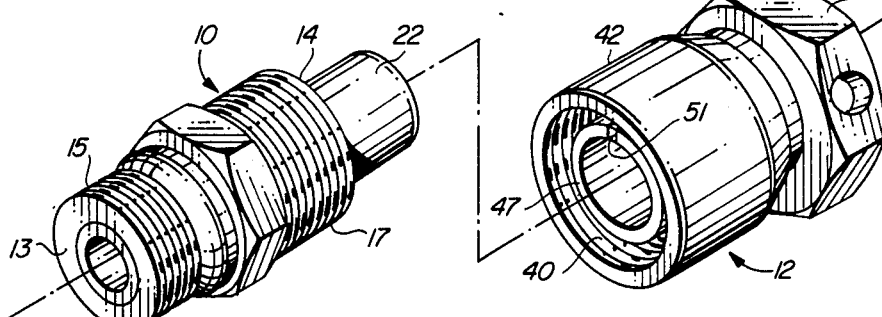
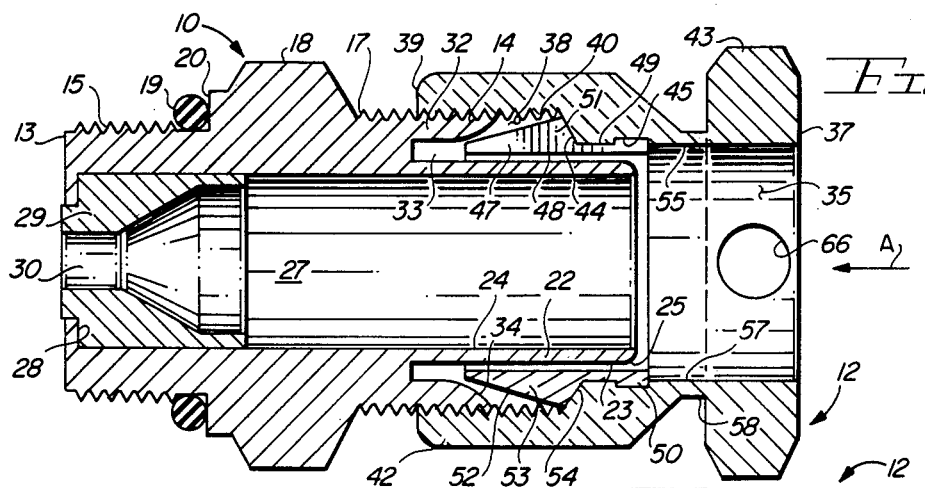
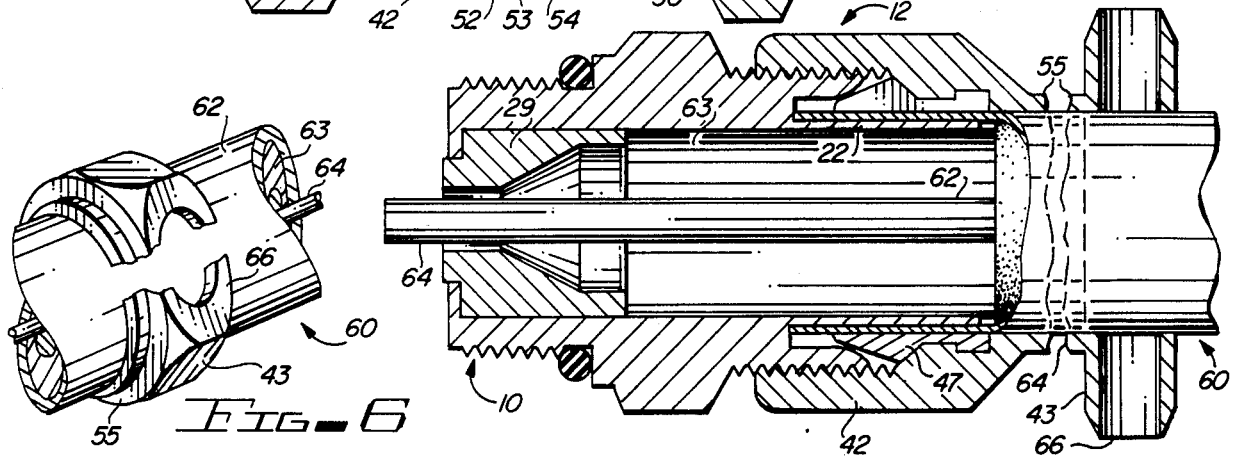

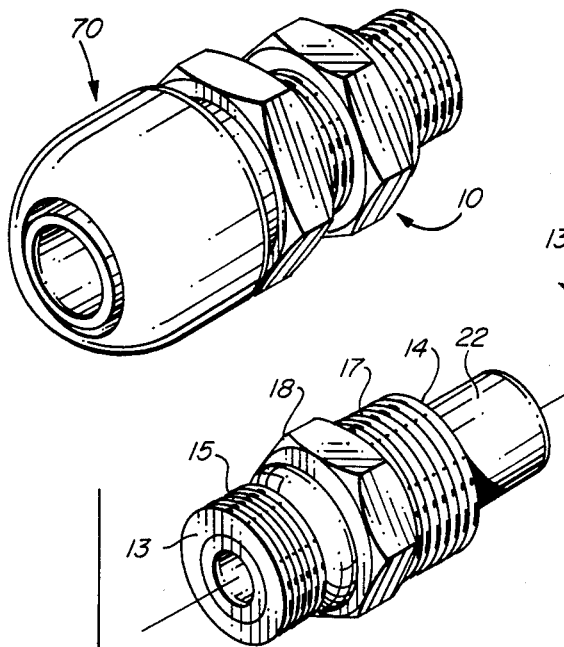
FIG-7
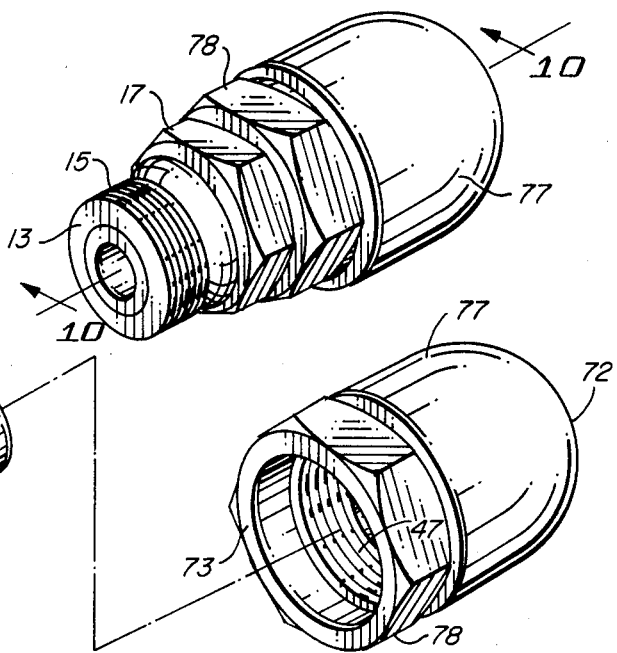
FIG-8
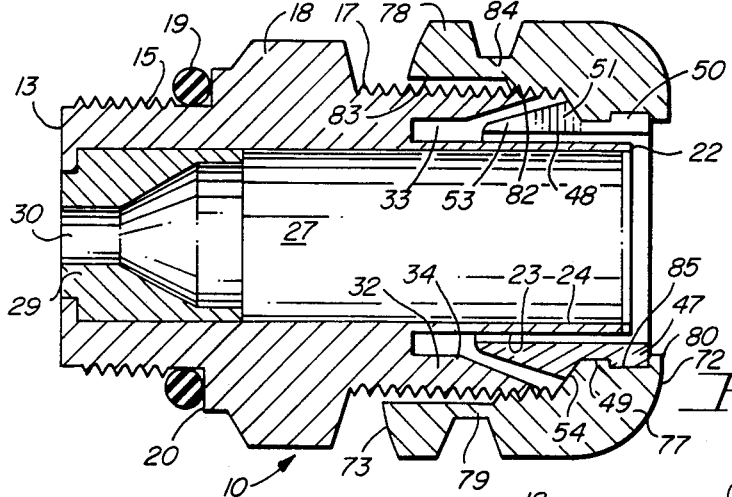
FIG-9
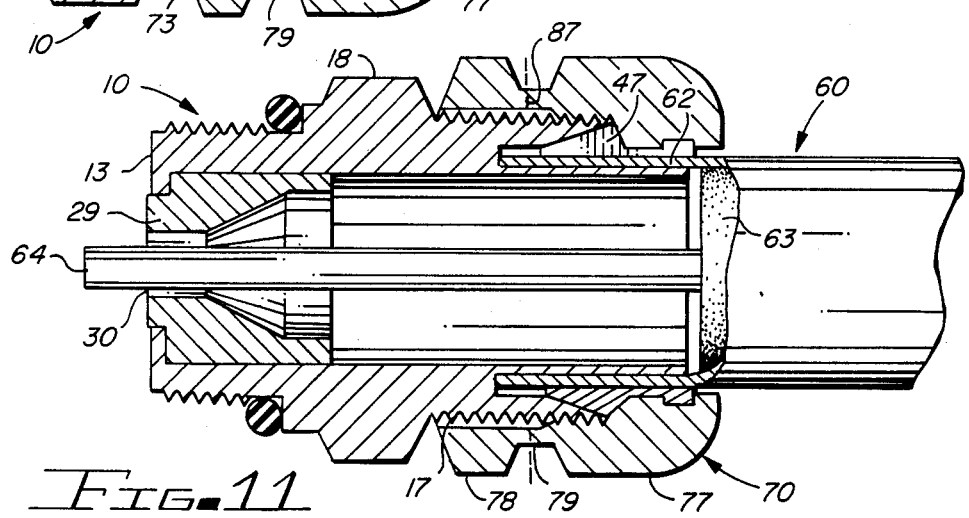
FIG-10
FIG-11

CONTROLLED TORQUE CONNECTOR ASSEMBLY

FIELD OF THE INVENTION

This invention relates to devices and accessories for use in connection with coaxial cable.

More particularly, the present invention relates to cable connectors.

In a further and more specific aspect, the instant invention concerns a connector assembly having improved means for securement to a coaxial cable.

PRIOR ART

The prior art is replete with various connector assemblies for use in conjunction with signal transmission systems of the type utilizing coaxial cable. The connector assemblies are customarily employed to terminate the cable, adapt the cable for attachment to various devices and equipment and to effect cable-to-cable splices.

Commonly, a connector assembly is provided at one end with means for securement to a coaxial cable. The securement is generally mechanical and electrical. Means, such as threads, reside at the other end for attachment to a selected device. In a splice, the assembly carries cable securement means at each end.

The typical coaxial cable embodies an outer conductor in the form of a relatively thin tublar metallic element encasing a dielectric through which the center conductor projects. The conventional connector assembly includes a body portion, gripping means for receiving the outer conductor, and a nut portion. Generally fabricated of metal, such as brass or aluminum, the body portion functions as an extension of the outer conductor.

Commonly, the gripping means includes a thin walled tublar mandrel extending from the body portion. After preparation of the cable, which includes removal of a portion of the dielectric, the mandrel is inserted within the outer conductor. A constrictable element, such as a ferrule or collet which may be integral to the body portion or a separate component, is sized to closely receive the outer conductor.

The nut portion cooperates with the body portion for contracting the constrictable element. Generally, the nut portion, which is bored to receive the cable, is threadedly engagable with the body portion. In response to threadedly advancement of the nut portion upon the body portion, the constrictable element is wedged inwardly and the inside diameter is reduced. Resultingly, the outer conductor is captivated within the gripping means. The mandrel functions as an anvil, opposing the constrictable element and compressing the outer conductor therebetween.

The compressive force exerted upon the outer conductor is progressive. That is, the size of the constrictive element is reduced in proportion to the advancement of the nut portion upon the body portion. Such advancement is in response to rotation of the nut portion relative to the body portion, usually by a wrench engaged with the tool receiving section of the nut portion.

Meticulous tightening of the gripping means is imperative for proper functioning of the signal transmission system. A loose connection fails to provide positive contact for constant signal transmission. In addition to the possible accidental withdrawal of the cable from the connector, the loose connection permits the entrance of deliterious environmental elements which are corrosive to the metallic contact surfaces. Coversely, an over tightened nut can damage the assembly, especially fracturing the outer conductor.

Connector assemblies are frequently affixed to coaxial cable under field conditions. It is well known that exacting precise manipulation is exceedingly difficult in such circumstances. Workmen, who may be of marginal skill, are attempting to perform under adverse conditions. The torque applied to the nut portion is gauged by "feel" which is distorted by tool characteristics such as configuration and length of handle. Feel is also dependent upon the immediate physical and mental composure of the workman.

Therefore, less than satisfactory unions are commonplace. If detected immediately, the default can be cured at the expense of additional cable, a replacement connector assembly and labor. Subsequent discovery of an inferior signal or leakage requires additional effort to trace through the myriad of connector assemblies within a system to locate the offensive device.

It would be highly advantageous, therefore, to remedy the deficiencies inherent in the prior art.

Accordingly, it is an object of the instant invention to provide an improved cable connector assembly.

Another object of the invention is the provision of a connector assembly having ameliorated means for securement to a coaxial cable.

And another object of the invention is to provide improved cable securement means which can be readily incorporated into various connector assemblies of conventional prior art designs.

Still another object of the immediate invention is the provision of a connector assembly especially adapted to be secured to a cable under field or adverse conditions.

Yet another object of the invention is to provide a connector assembly having means for eliminating workman-induced inaccuracies in the tightening of the connector on to the cable.

Yet still another object of the present invention is the provision of improved cable gripping means which will preserve the integrity of the cable.

And a further object of the invention is to provide cable gripping means in which the compressive force exerted upon the cable can be controlled within predetermined limits.

Yet a further object of this invention is the provision of an improved connector assembly which can be readily installed with conventional skills and tools.

Still a further object of the invention is to provide means for achieving a visually verifiable demonstration that the connector has been tightened within prescribed limits.

And yet a further object to the invention is the provision of an improved connector assembly of unencumbered design, having relatively few uncomplicated components.

Yet still a further object of the invention is to provide a device of the above character which is conventionally manufacturable in accordance with standard technology.

SUMMARY OF THE INVENTION

Briefly, to achieve the desired objects of the improved connector assembly of the instant invention in accordance with a preferred embodiment thereof, provided are means for controlling the compressive force exerted by the gripping means upon a coaxial cable within pre-determined limits. More specifically, the invention includes means for terminating rotation of the body portion engaging section of the nut portion relative the body portion when the compressive force has reached the minimum value of the pre-determined limit.

In accordance with an embodiment of the invention, a frangible section of known shearing characteristic under torsion resides intermediate the body portion engaging section and the tool receiving section of the nut portion. Means are also provided for facilitating removal of the separated tool receiving section from the cable.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings, in which:

FIG. 1 a perspective view of an improved connector assembly embodying the teachings of the instant invention;

FIG. 2 is another perspective illustration of the embodiment of FIG. 1 as viewed from the other end thereof;

FIG. 3 is an exploded perspective view of the device of FIG. 2;

FIG. 4 is an enlarged vertical sectional view taken along the line 4—4 of FIG. 2;

FIG. 5 is a view generally corresponding to the view of FIG. 4 and further illustrating the device as it would appear when engaged with a coaxial cable;

FIG. 6 is a perspective view of a fragmentary length of coaxial cable having the separated tool receiving sections engaged therewith as it would appear after union of connector assembly with the cable as seen in FIG. 5;

FIG. 7 is a perspective view of an alternate cable connector assembly constructed in accordance with the teachings of the instant invention;, FIG. 8 is another perspective illustration of the embodiment of FIG. 7 as viewed from the other end thereof;

FIG. 9 is an exploded perspective view of the device of FIG. 8;

FIG. 10 is an enlarged verticle sectional view taken along the line 10—10 of FIG. 8; and FIG. 11 is a view generally corresponding to the view of FIG. 10 and further illustrating the device thereof as it would appear when engaged with a coaxial cable.

DESCRIPTION OF THE PREFERRED EMBODIMENTS

Turning now to the drawings in which like reference characters indicate corresponding elements throughout the several views, attention is first directed to FIGS. 1 and 2 which illustrate an embodiment of the improved connector assembly of the instant invention having two major normally separable components which, for purposes of discussion, are termed the body portion and the nut portion and generally designated by the reference characters 10 and 12, respectively. The connector illustrated is intended to be typical of conventional prior art assemblies conventionally used for mechanically and electrically securing a coaxial cable to a selected device or item of equipment or effect cable-to-cable splices. The improvements thereto will be discussed presently.

With further reference to FIGS. 3 and 4 it is seen that body portion 10 generally fabricated of an electrical conducting material and having forward end 13 and rearward end 14, includes forward externally threaded segment 15 and rearward externally threaded segment 17. Tool receiving segment 18, specially a hexagonal configuration for receiving a wrench, resides intermediate threaded segments 15 and 17. Seal 19, preferrably an O-ring, encircles body portion 10 rearward of threaded section adjacent annular shoulder 20.

Forward threaded segment 15 is of industrial standard diameter and pitch for attachment to various matingly threaded devices and equipment. Seal 19 hermetically seals the connector assembly to the selected device. Rearward threaded segment 17 receives nut portion 12 as will be further described in the ensuring description.

Tool receiving segment 18 plays the dual function of rotating body portion 10 during attachment to the selected device and of stablizing body portion 10 during rotation of nut portion 12.

Mandrel 22 extends from rearward end 14 of body portion 10. In the form of a thin walled tublar element having outer surface 23, inner surface 24 and free end 25, mandrel 24 is sized to be received within the outer conductor of a coaxial cable in accordance with conventional practice. Inner surface 24 is continuous with bore 27, extending inwardly from rearward end 14 and terminating with inwardly directed annular shoulder 28 at forward end 13. Insert 29, fabricated of an insulative material, resides in the forward portion of bore 27 against shoulder 28. Bore 30 extending through insert 29 is sized to receive the center conductor of the coaxial cable therethrough.

The forward terminal portion of body 10 is in the form of an annular projection 32 concentric with mandrel 22. Blind annular recess 33, between mandrel 22 and annular projection 32, receives the terminal portion of the outer conductor of the coaxial cable. Forwardly, inwardly beveled surface 34 is formed at the free end of annular projection 32. The function of beveled surface 34 will be explained presently.

Nut portion 12 includes bore 35 extending inwardly from rearward end 37 and counter bore 38 extending inwardly from forward end 39. Bore 35 is of sufficient diameter to receive the outer conductor of the coaxial cable therethrough. Counter bore 38 carries internal thread 40 matingly receivable with threaded segment 17 of body portion 10. Bore 38, internal thread 40 and forward end 39 of nut portion 12 are carried by the body portion engaging section 42 of nut portion 12. Adjacent rearward end 37 of nut portion 12 is tool receiving section 43. For purposes of illustration, tool receiving portion 43 is shown as having the familiar hexagonal external configuration for purposes of receiving a conventional wrench.

Bore 38 terminates at the rearward end with inwardly rearwardly directed beveled shoulder 44. Annular recess 45 is formed in bore 35. Ferrule 47 having bore 48 for closely receiving the outer conductor of the coaxial cable is carried by nut portion 12. Outer cylindrioal surface 49 is rotatable within bore 35. Annular projection 50 is captive, as by snap engagement, within annular recess 45. Accordingly, ferrule 47 is rotatable relative nut portion 12. Outer surface 52 of truncated conical forward section 53 is matingly receivable against beveled surface 34. Forward section 53 terminates at the rearward end with beveled shoulder 54 which mates with opposing beveled shoulder 44.

Mandrel 22 and ferrule 47 cooperate as gripping means for compressively gripping the outer conductor of the coaxial cable. Ferrule 47, being fabricated of a deformable material and being severed along longitudinal slit 51, functions as a constrictable element. In response to relative rotation, nut portion 12 advances, in the direction of arrowed line A, upon body portion 10. During advancement of nut portion 12, shoulder 44 bearing against 54, urges ferrule 47 forwardly, in the direction of arrowed line A, causing surface 52 to work against beveled surface 34 of body portion 10. Moving against beveled surface 34, surface 52 is wedged inwardly, tending to close slit 51 and constricting ferrule 47, thereby reducing the diameter of bore 48. Mandrel 22 functions as an anvil, opposing the decreasing diameter of bore 48 and compressively gripping the outer conductor of the cable therebetween. The compressive force exerted upon the cable is progressive. That is, the compressive force exerted upon the cable increases in proportion to continued advancement of nut portion 12 upon body portion 10.

Frangible section 55 resides intermediate body portion engaging section 42 and tool receiving section 43 of nut portion 12. In accordance with the immediate embodiment of the invention frangible section 55 is generally cylindrical having inside diameter 57 continuous with bore 35 and concentric outside diameter 58. Torque applied to tool receiving section 43 is transmitted through frangible area 55 for advancement of body portion engaging section 42 upon body portion 10.

For each size or configuration of cable, there is a standard compressive force, within upper and lower limits of tolerance, to provide an ideal union between the cable and the cable connector. The compressive force is directly related to the advancement of nut portion 12 upon body portion 10 as controlled by the torque applied to the tool receiving section 43. The torque transmitted from tool receiving section 43 to the body portion engaging section 42 is a function of the cross sectional area of frangible section 55 and the material of fabrication of nut portion 12.

By controlling diameters 57 and 58 within standard production tolerances in accordance with conventional techniques, the torque applied to body portion engaging section 42 can be controlled within limits for exerting ideal compressive force upon the coaxial cable. The greater torque applied to the tool receiving section 43 will exceed the shear strength under torsion of frangible section 55. That is, frangible section 55 will fracture, separating tool receiving section 43 from body portion engaging section 42 when the prescribed torque is exceeded.

The torque transmittable through frangible area 55 is readily calculable by the following formula:

$$S = \frac{16}{\pi} \cdot \frac{Td_2}{(d_2^4 - d_1^4)}$$

where:
S=stress factor of material of fabrication expressed in pounds per square inch,
T=torque expressed in inch pounds,
$d_1$=inside diameter of frangible section expressed in inches, and
$d_2$=outside diameter of frangible section expressed in inches.

Assuming the nut portion is machined from 6262-T9 alloy aluminum in a size suitable for 0.50 cable, where: the equation for minimum torque for fracturing the frangible section becomes:

$$35,000 = \frac{16}{3.1416} \cdot \frac{T(.626)}{(.626^4 - .597^4)}.$$

Solving for T yields:

$$35,000 = 5.093 \cdot \frac{T.626}{.1535 - .1270}$$

$$35,000 = 120.43T$$

$$T = \frac{35,000}{120.43}$$

$$T = 290.61 \text{ in} \cdot \text{lbs}$$
$$= 24.21 \text{ ft} \cdot \text{lbs}$$

The equation for maximum torque for fracturing the frangible section becomes:

$$35,000 = \frac{16}{3.1416} \cdot \frac{T(.628)}{(.628^4 - .593^4)},$$

which when solved yields:

T=29.07 ft. lbs

Thus, it is seen that, in accordance with the immediately preferred embodiment of the instant invention, the torque to which nut portion 12 will be tightened upon body portion 10 in a connector of a size for one half inch cable will be limited to a nominal 26.15 ft. lbs within a tolerance of approximately 2.5 ft. lbs. This yields a compressive force, between ferrule 47 and mandrel 22, upon the outer conductor which is within desireable design tolerances.

As a further example, utilizing the above formula, a cable connector assembly fabricated in accordance with the teachings of the instant invention to accomodate five eights inch diameter cable can be tightened to a torque ranging between approximately 29.3 ft. lbs and a 36.7 ft. lbs. This is assuming the same material of construction and manufacturing tolerance as set forth in the previous example.

The torque required to fracture the frangible section considering a given material of construction, is proportional to the cross-sectional area of the wall of the frangible section. The cross-sectional area is a function of the inside diameter and the outside diameter. Therefore, it is apparent that the tolerance for the fracturing torque, shear strength under torsion, can be controlled by manufacturing tolerances. Closer manufacturing tolerances will yield less tolerance on the torque to cause fracturing. Conversely, more lenient manufacturing tolerances will result in greater deviation the nominal torque required to separate the nut section from the body portion engaging section.

FIG. 5 illustrates the previously described connector assembly of the instant invention as it would appear when secured to a coaxial cable generally designated by the reference character 60. Being of a conventional commercially available type, coaxial cable 60 includes tublar outer conductor 62 dielectric 63 and center conductor 64. Body portion engaging section 42 has been tightened to the prescribed torque upon body portion 10 constricting ferrule 47 as a result of the wedging action between surfaces 32 and 34. Resultingly, outer conductor 62, a relatively thin walled metallic element, is compressed between ferrule 47 and mandrel 22. In accordance with conventional practice, a mechanical and electrical connection is made between the connector assembly and the outer conductor 62. Center conductor 64 extend through bore 30 of insert 29 is insulated from body 10. It is noted that the cable has been prepared in accordance with conventional technique.

Torque beyond the shear strength of frangible section 55 has been applied to tool receiving section 43. In response thereto frangible section 55 has fractured, as representatively illustrated by the broken line 64 separating tool receiving section 43 from body portion engaging section 42 of nut portion 12. In the immediate illustration, it is seen that tool receiving section 43, separated from nut portion 12, remains intact and encircling cable 60.

As viewed in FIGS. 4 and 5, transverse bore 66 extends through tool receiving section 43. The diameter of bore 66 approaches the front to rear thickness of tool receiving section 43. While providing a highly weakened section, bore 66 is of no consequence during the tightening of nut portion 12 as previously described.

As seen in FIG. 6, bore 66 provides means for removal of the severed section 43 from cable 60. In response to the cutting action of a conventional cutting tool, such as a nipper or wire cutter, applied to tool receiving section 43 in the area of bore 66, tool receiving section 43 will readily fracture along the thinned areas ajacent bore 66. Thus, the tool receiving section is conveniently removed from cable 60.

With reference to FIG. 7, there is seen an alternate embodiment of the instant invention including a body portion, generally designated by reference character 10, and a nut portion generally designated by reference character 70. Body portion 10, as previously described and further illustrated in FIGS. 8 and 9, include forward end 13, rearward end 14, forward externally threaded segment 15, rearward externally threaded segment 17, tool receiving segment 18 and mandrel 22 projecting from rearward end 14. With further reference to FIG. 10, there is seen insert 29 having bore 30 and annular projection 32 coaxial with mandrel 22 to form blind annular recess 33 and terminating with beveled surface 34.

Nut portion 70, being an alternate embodiment of previously described nut portion 12 having rearward end 72 and forward end 73, includes body portion engaging section 77 and tool receiving section 78 with frangible section 79 therebetween. In contrast to the previously described embodiment, body portion engaging section 77 is adjacent rearward end 72 and tool receiving section 8 is adjacent forward end 73.

As particularly illustrated in FIG. 10, bore 80 extends through nut portion 70. First counter bore 82 extends inwardly from forward end 73. Counter bore 82 is internally threaded for mating engagement with rearward externally threaded segment 17 of body portion 10. Second counter bore 83, also extending inwardly from forward end 73, has a diameter greater than the major diameter of the threads carried by segment 17. Counter bore 83 extends continuously through tool receiving section 78 and frangible section 79. Accordingly, neither tool receiving section 78 nor frangible section 79 are threaddedly engagable with body 10. To correlate with the previously described corresponding element, frangible section 79 is generally cylindrical having inside diameter 83 in concentric outside diameter 84.

Ferrule 47, as previously described, having bore 48, outer cylindrical surface 49, slit 51, truncated conical forward section 53 and beveled shoulder 54, Ferrule 47 is held captive in body portion engaging section 72 by the engagement of annular projection 50, carried by outer cylindrical surface 49, within annular recess 85 formed in bore 80.

The function of nut portion 70 is generally analogous to the function of nut portion 12. Torque applied to tool receiving section 78 is transmitted through frangible section 79 for advancement of body portion engaging section 77 upon body portion 10. As body portion engaging section 77 advances upon body portion 10 ferrule 47 is constricted about coaxial cable 60. Specifically, outer conductor 62 is compressed between outer surface 23 of mandrel 22 and bore 48 of ferrule 47. After the tightening of nut 70 is completed, the application of additional torque beyond the shear strength of frangible section 79 will cause the section to fracture along a line as graphically represented by the broken line 87 in FIG. 11. The immediate illustration depicts the connector of the instant assembling at an instantaneous time after completion of attachment to coaxial cable 60 and prior to separation of tool receiving section 78 from body portion engaging section 77.

The formula previously set forth is directly adaptable to the immediate embodiment. The shear strength of frangible section 79 is proportional to the cross-sectional area thereof. However, due to the necessity of providing clearance for receiving rearward externally threaded segment 17 of body 10, inside diameter 83 and outside diameter 79 are substantially larger for any given size of coaxial cable.

In the immediate embodiment, in contrast to the previously described embodiment, the severed tool receiving section 78 remains captive upon the connector assembly. This will present no problem to the functioning of the device.

Various changes and modifications to the embodiment herein chosen for purposes of illustration will readily occur to those skilled in the art. For example, the connector assembly may be fabricated of materials other than the specific aluminum alloy used in the foregoing example. The differing materials will, of course, generate different input into the foregoing formula by virtue of the stress fracture of the selected material. Also, it will be appreciated that the teachings of the instant invention are applicable to connector assemblies of known types other than the embodiment chosen for purposes of illustration. Such other connectors may incorporate various cable gripping means known in the art. Further, the teachings are applicable to other devices, such as cable-to-cable splices.

With specific reference to the nut portion generally designated by the reference character 70, it is apparent that the tool receiving section 78 may be provided with a transverse bore such as bore 66 described in connection with nut portion 12, for similar purposes. It is also contemplated that the inside diameter, bore 83, of tool receiving section 78 may be of sufficient diameter for removal over tool receiving segment 18 of body portion 10 after completion of the cable securement operation.

The presence of the severed tool receiving section, however, serves as a visual indicator that proper securement has been achieved.

To the extent that such modifications and variations do not depart from the spirit of the invention, they are intended to be included within the scope thereof which is assessed only by a fair interpretation of the following claims.

Having fully described the invention and a preferred embodiment thereof, in such clear and concise terms as to enable those skilled in the art to understand and practice the same, the invention claimed is:

1. In a connector assembly for securement to a coaxial cable, which assembly includes,
   a body portion,
   a nut portion for receiving said cable therethrough and having a body portion engaging section and a tool receiving section,
   said body portion engaging section being rotatable in response to torque applied to said tool receiving section, and
   gripping means for compressively gripping said cable in response to rotation of said nut portion relative said body portion,
   said gripping means exerting an increasing compressive force upon said cable in proportion to continued rotation of said nut portion,
   gripping means engaging means at the end of said body portion engaging section,
improvements therein for preventing damage to said cable as a result of over tightening said gripping means, said improvements comprising:
   means between said sections for limiting the compressive force exerted by said gripping means to a predetermined value.

2. The improvements of Claim 1, wherein said means for limiting the compressive force includes means for terminating rotation of the body portion section engaging of said nut portion when said compressive force has reached said predetermined value.

3. The improvements of claim 1, wherein said means for terminating rotation includes means for discontinuing driving engagement between the tool receiving section and the body portion engaging section of said nut portion in response to said compressive force attaining said pre-determined value.

4. The improvements of claim 1, wherein said means for limiting the compressive force includes means for limiting the torque transmitted from the tool receiving section to the body portion engaging section of said nut portion to a predetermined value.

5. In a connector assembly for securement to a coaxial cable, which assembly includes,
   a body portion,
   a nut portion for receiving said cable therethrough and having a body portion engaging section and a tool receiving section,
   said body portion engaging section being rotatable in response to torque applied to said tool receiving section, and
   gripping means for compressively gripping said cable in response to rotation of said nut portion relative said body portion,
   said gripping means exerting and increasing compressive force upon said cable in proportion to continued rotation of said nut portion,
improvements therein for preventing damage to said cable as a result of over tightening said gripping means, said improvements comprising:
   means for limiting the torque transmitted from the tool receiving section to the body portion engaging section of said nut portion to a predetermined value, wherein said means for limiting the torque transmitted includes means for separating said tool receiving section from said body portion engaging section when said predetermined value has been attained; and
   means for facilitating removal of said tool receiving section from said cable after separation from said body portion engaging section.

6. The improvements of claim 5, wherein said means for separating includes a frangible section of known shear strength under torsion.

7. The improvements of claim 6, wherein said frangible section resides intermediate the body portion engaging section and the tool receiving section of said nut portion.

8. The improvements of claim 7, wherein said means for facilitating removal includes means defining an area of reduced strength whereby said tool receiving portion is subject to fracturing in response to application of torque about an axis generally transverse to the longitudinal axis of said cable.

9. The improvements of claim 8, wherein said area of reduced strength includes a perforation.

10. The improvements of claim 9, wherein said perforation is in the form of a bore extending generally transverse of said tool engaging section.

11. The improvements of claim 7 further including a bore extending through said tool receiving section and said frangible section for non-engagibly receiving said body portion.

12. An improved connector assembly for compressive securement to a coaxial cable and for limiting the force of said compressive securement to prevent damage to said cable, said improved connector assembly comprising:
   a. a body portion including
      i. a rearward end, and
      ii. an externally threaded nut receiving segment proximate the rearward end;
   b. gripping means for compressively gripping said cable; and
   c. a nut portion having a bore therethrough for receiving said cable including
      i. a forward end, an internally threaded counterbone extending inwardly from said forward end,
      ii. a rearward end,
      iii. a body portion engaging segment rotatably engagable with said nut receiving segment,
      iv. a tool receiving segment rotatable in response to an applied torque, a second counterbore extending inwardly from the forward end of said nut portion through said tool receiving segment and sized for clearance over the external thread carried by the nut receiving segment of said body portion, and
      v. torque transmitting means for transmitting rotation from said tool receiving segment to said body portion engaging segment, said gripping means exerting a progressively increasing compressive force upon said cable in response to continued rotation of said body portion engaging segment, said torque transmitting means being in the form of a frangible section having a predetermined shear strength under torsion residing intermediate the body portion engagement section and the tool receiving segment of said nut portion and capable of transmitting a predetermined maximum torque selected to prevent damage to said cable.

13. The improved connector assembly of claim 12, wherein said body portion engaging segment resides forwardly of said tool receiving segment.

14. The improved connector assembly of claim 12, wherein said body portion engaging segment resides rearwardly of said tool receiving segment.

* * * * *